Figure 1:
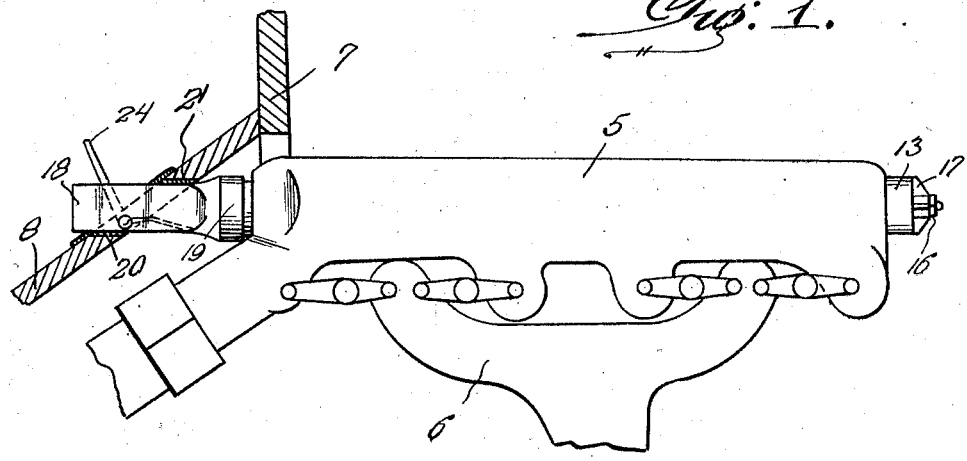

April 21, 1925.　　　　　　　　　　　　　　　　1,534,483

O. G. ARMSTRONG

HEATER FOR MOTOR VEHICLES

Filed March 21, 1924

O. G. Armstrong,
Inventor

By Clarence A. O'Brien
Attorney

Patented Apr. 21, 1925.

1,534,483

UNITED STATES PATENT OFFICE.

ORLAN G. ARMSTRONG, OF ALLIANCE, OHIO.

HEATER FOR MOTOR VEHICLES.

Application filed March 21, 1924. Serial No. 700,900.

*To all whom it may concern:*

Be it known that I, ORLAN G. ARMSTRONG, a citizen of the United States, residing at Alliance, in the county of Stark and State of Ohio, have invented certain new and useful Improvements in a Heater for Motor Vehicles, of which the following is a specification.

This invention relates to the general art of motor vehicles and has more particular reference to a heat supplying means for the body thereof, the primary object of the invention residing in the provision of such a means that may be readily associated with practically all types of motor vehicles and primarily those of the Ford type.

An additional object of the invention is to provide a means of the above character that includes an air pipe adapted to be positioned within the exhaust manifold of the engine and having its opposite end extending therethrough whereby air passing through the pipe will be heated by the exhaust gases passing through the manifold, means being provided at the discharge end of said pipe for leading the heated air into the body of the vehicle and at a point preferably adjacent the driver's seat thereof.

An additional object of the invention is to provide means wherein the heated air passing through said pipe may be directed interiorly or exteriorly of the car body as desired.

With the foregoing and other objects in view as the nature of the invention will be better understood the same comprises the novel form, combination and arrangement of parts hereinafter more fully described, shown in the accompanying drawing and claimed.

In the drawing wherein like reference characters indicate corresponding parts throughout the several views.

Figure 2:
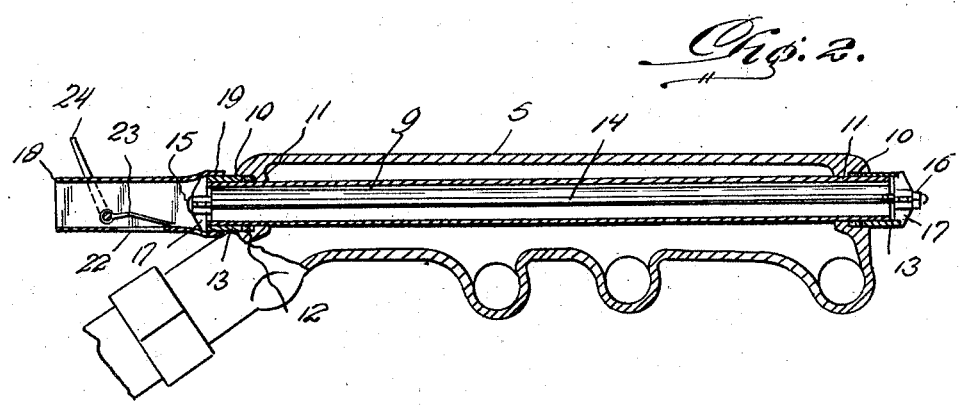
Figure 3:
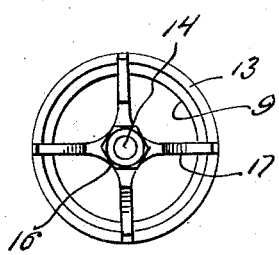

Figure 1 is a fragmentary side elevational view of a vehicle motor, and a portion of the vehicle body equipped with a heating means constructed in accordance with the present invention, Figure 2 is a detail longitudinal sectional view through the exhaust manifold of the motor, and through my improved heating means, and Figure 3 is an enlarged front end elevational view of the air conveying pipe per se that is adapted to be disposed within the exhaust manifold of the engine, said air pipe constituting the main essential of the present invention.

Now having particular reference to the drawing, 5 designates the exhaust manifold of an internal combustion engine and 6 the intake manifold thereof. The engine of which said exhaust and intake manifolds constitute essential elements is carried by a well known form of vehicle and the dash of said vehicle is designated 7 while the usual inclined foot board is designated by the reference character 8. My invention per se embodies the provision of a relatively elongated tubular metallic pipe 9 that is disposed horizontally within said exhaust manifold 5. In this instance the front and rear ends of said manifold 5 are formed with registering openings 10—10, the inner ends of which are shouldered as at 11—11.

In actual practice said pipe 9 is extended within said manifold 5 through the forward opening thereof and the opposite ends of this pipe are adapted to extend outwardly of the openings in the opposite ends of said manifold 5, as clearly shown in Figures 1 and 2. Surrounding the ends of said pipe 9 within the openings 10—10 at the opposite ends of the manifold 5 and abutting the shoulders 11—11 are packing glands 12—12, and detachably disposed upon the opposite ends of the pipe are gland compressing collars 13—13. Adapted to be extended longitudinally through said pipe 9 is a rod 14 that is headed at one end as at 15 and screw threaded at its opposite end for the reception of a nut 16. Positioned upon the opposite ends of said rod 14 are cruciform shaped spiders 17—17 that are adapted for engagement with the outer edges of said collars 13—13 whereby when the nut 16 is turned upwardly upon said rod, these spiders will effectively draw the collars 13—13 into the openings 10 for tightly securing the pipe 9 within the manifold and at the same time providing a tight joint between this pipe and the openings in said manifold.

Removably disposed upon the rearmost projecting end of the air conveying pipe 9 is a relatively short metallic pipe section 18 that is preferably angular shape in cross section, the forward end of this pipe being formed with a flared circular shaped portion 19 for tight engagement over the adjacent end of said air conveying pipe 9.

The foot board 8 of the vehicle body is formed with a horizontally arranged opening 20 within which is disposed a protecting sleeve 21 of metal and through which extends said pipe section 18 as clearly shown in Figure 1. The bottom wall of this pipe section is formed with an opening 22 and within said pipe is a gate valve 23 that may be swung through the medium of an arm 24 upon the outside of said pipe section whereby the hot air passing through the pipe may be guided into the vehicle body or outwardly through the opening 22 in the pipe section 18 in an obvious manner.

From the foregoing it will be obvious that a portion of the air projected rearwardly over the motor surface by the usual air fan will pass through said pipe 9 and due to the high degree of heat of the exhaust gases within said manifold 5 the pipe 9 will be heated for consequently heating the air passing therethrough. When the gate valve 23 is in the position shown in Figures 1 and 2 this air will pass through said pipe section 18 into the vehicle body for manifestly keeping the occupants of the front seat warm. When it is desired to prevent this heated air from passing into the car body, said gate valve 23 may be swung upwardly for manifestly closing the discharge end of the pipe section 18 for allowing the air to pass through the opening 22 and then beneath the car body.

The specific operation together with numerous advantages of a heating means for vehicles of this character will be at once appreciated by those skilled in the art, and even though I have herein shown and described the most practical embodiments of the invention with which I am at this time familiar, it is nevertheless to be understood that minor changes may be made in the invention without departing from the spirit and scope of the appended claim.

Having thus described my invention, what I claim as new and desire to secure by Letters Patent is:—

A heater comprising a manifold body provided at its opposite ends with openings, a pipe having its end portions passing through the openings, collars mounted upon the end portions of the pipe and partially entering the openings of the manifold body, spiders positioned against the outer ends of the collars and a rod traversing the length of the pipe and engaging the spiders and adapted to draw the spiders toward each other whereby the collars are moved along the pipe and projected into the openings of the manifold body.

In testimony whereof I affix my signature.

ORLAN G. ARMSTRONG.